UNITED STATES PATENT OFFICE.

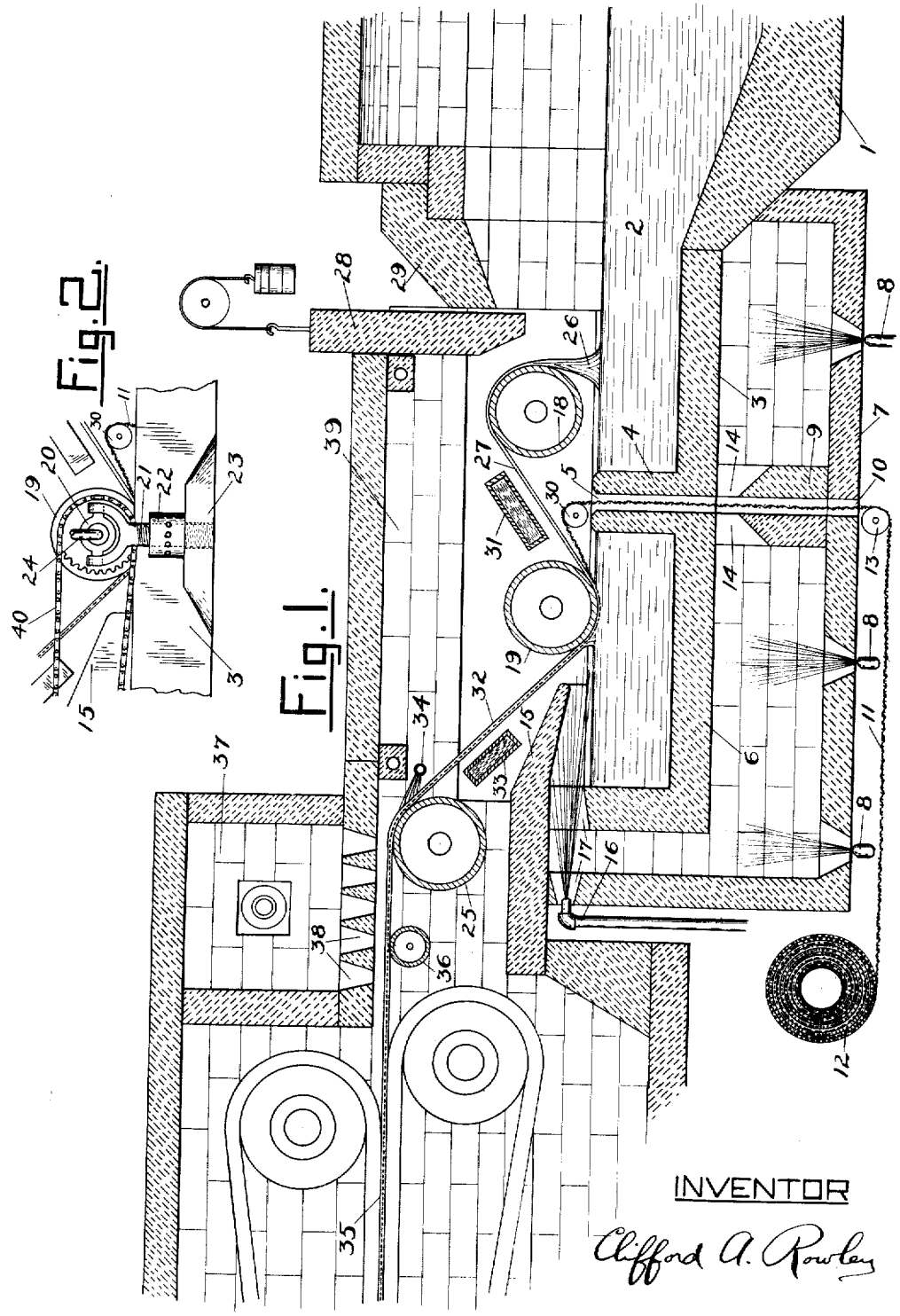

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR DRAWING WIRE GLASS.

1,425,218.  Specification of Letters Patent.  Patented Aug. 8, 1922.

Application filed February 17, 1921. Serial No. 445,602.

*To all whom it may concern:*

Be it known that I, CLIFFORD A. ROWLEY, a citizen of the United States, residing at Toledo, in the county of Lucas and State of Ohio, have invented new and useful Improvements in Methods and Apparatus for Drawing Wire Glass, of which the following is a specification.

This invention relates to a new and improved method and apparatus for drawing wire-glass from a bath of molten glass.

In the customary process of producing wire-glass, or sheet glass with a layer of wire mesh embedded therein, a layer of molten glass is first rolled out on a suitable table, a sheet of wire mesh is then superposed thereon, and a second layer of molten glass rolled on above the wire. The sheet thus formed has molten and imperfect surfaces, and if required to be transparent, must be subsequently ground and polished, as in the ordinary practice of making plate glass. This is necessarily a long and expensive process. The present invention aims to produce transparent sheet glass of a high quality, with an embedded wire mesh, by a simple and continuous drawing process.

The details of the invention will be more clearly understood from the following description, taken in connection with the accompanying drawings showing one form of apparatus adapted to carry out this process.

In the drawings:

Fig. 1 is a longitudinal vertical central section through the apparatus, and

Fig. 2 is a partial end elevation of the intermediate bending roll, showing its adjustable mounting.

At 1 is shown the discharge end of a continuous tank furnace, from which a flow of molten glass 2 is maintained to the shallow receptacle or draw-pot 3. Intermediate the length of receptacle 3 is an upwardly projecting nozzle 4, containing a transverse slot 5, extending vertically through the pot. This nozzle 4 does not extend entirely the width of the pot, but there is a substantial passage around each end thereof, through which the molten glass flows to the far end 6 of the receptacle. Beneath the receptacle or draw-pot is the heating chamber 7, heated by suitable burners as indicated at 8, and through this chamber is a central partition 9, having a slot 10 therethrough communicating with the slot 5 in nozzle 4. A sheet of wire mesh 11, is fed from a conveniently located supply roll 12, around roller 13, and up through the slot 10—5. Some of the heated gases from the chamber 7, pass through ports 14 in the partition 9, and up through slot 5 to heat the sheet of wire mesh 11 to a temperature comparable with that of the molten glass. The heating chamber 7 extends up around the far end 6 of the drawpot, and a lip tile or cover shield 15 encloses a portion of this end of the receptacle as shown in Fig. 1. A series of burners 16 directed in beneath this lip tile, through ports 17 act in conjunction with the heated gases from chamber 7 to maintain the molten glass in the far end 6 of the receptacle at a high degree of fluidity.

Mounted transversely of the pot, a short distance above the molten glass, on the furnace side of nozzle 4, is a horizontal internally cooled metallic roll 18. Roll 19 is carried in bearings 20 vertically adjustable by means of any suitable mechanism. As illustrated in Fig. 2, each bearing 20 is pivotally carried at the upper end of a threaded standard 21, engaged by a nut 22, supported by block 23. By adjusting the nuts 22, the roll 19 may be raised clear of the molten glass 2, or may be lowered so that its lower surface dips slightly into the molten bath. Rolls 18 and 19 are internally cooled by means of circulating water, air or other fluid, a pipe connection for supplying this fluid to roll 19 being indicated at 24, Fig. 2. The roll 19 is preferably water cooled to maintain it at quite a low temperature for reasons presently to be described. A third roll 25, similar to rolls 18 and 19, is mounted parallel to the others, at a point above and preferably somewhat beyond the receptacle 3, as indicated in Fig. 1.

While in operation, a mass of molten glass 26 is drawn up from the source 2, over cooled roll 18, and from this mass of glass a sheet 27 is stretched laterally. This method of obtaining a glass sheet is substantially the same as set forth in the copending application of Crowley, Serial Number 303,069, filed June 10, 1919. However, if desired, the roll 18 might be located higher above the molten glass 2, and the sheet drawn according to the process set forth in the Colburn patents, for example, 1,248,809, issued Dec. 4, 1917.

In the apparatus as here shown, a vertically adjustable shear-cake 28 is located between the downwardly inclined arch 29 at the end of the furnace and the roll 18, and by properly adjusting shear-cake 28 the heated gases issuing from the furnace may be directed to the desired point on the rising mass of glass 26.

The sheet 27, instead of being drawn horizontally, is directed downward at an angle so that it will be tangent to the lower surface of the roll 19. The sheet of wire mesh 11, is drawn up over guide roll 30, and also directed tangentially toward the lower surface of roll 19, beneath the sheet 27. The sheet 27, as it is drawn over and from the roll 18, and exposed to the cooler atmosphere becomes cooled and set, especially on its upper side. However, as the sheet is again brought down into proximity with the molten glass in receptacle 3, it is reheated and softened thereby, and by the heated gases confined between the molten glass and the sheet. To preserve the upper surface of the sheet, and the integrity of the sheet itself, a water-cooler 31 is placed above the sheet, which together with the cooled roll 19, and the cooler air above the sheet keeps the upper surface of the sheet sufficiently cooled so that it may pass beneath the cooled roll 19 without sticking thereto, or being injured thereby.

The lower surface of the sheet becomes so softened that the wire mesh, when drawn thereagainst becomes enmeshed therewith, and as the sheet and wire momentarily dip into and pass through the molten glass 2, a new coating of glass is drawn onto the lower surface of the sheet, enclosing the wire mesh, and a new and thicker sheet 32 is drawn up on the far side of roll 19. This sheet 32 is drawn tangent to, and passes over the bending roll 25. As shown in the drawings the sheet 32 is drawn away from roll 19 at an angle of about 45° with the vertical but it might be drawn vertically or at any convenient intermediate angle. With the angles of draw as shown in the drawings, the thicker sheet, with the enclosed wire is only bent through a very obtuse angle over roll 25, which will tend to avoid undue bending strain on the sheet.

The heaters 16, which are directed against the glass where sheet 32 leaves the pot, counteract the tendency of the sheet to pull away from roll 19, and also prevent too thick a coating being added to the sheet beneath roll 19. By properly adjusting these heaters 16, the final thickness of the sheet is properly regulated.

Below the sheet, between rolls 19 and 25, is a second cooler 33, adapted to adjust the temperature of the lower portion of the sheet, so that it may pass over roll 25 without sticking thereto or being marred thereby. Above the sheet, just before it reaches the roller 25, are burners 34, which reheat the sheet so that it may make the bend without fracturing. The sheet is drawn away horizontally from roll 25, by the drawing and flattening mechanism 35, which is only shown conventionally, and may be approximately of the form used in the Colburn patents, referred to above. Between this drawing mechanism and the roll 25, is an intermediate supporting roll 36, or rollers as may be necessary, while above the sheet is a reheating chamber 37, from which heat is directed downwardly through ports 38, to reheat the sheet and facilitate the flattening operation, and allow corrugations or wrinkles to be drawn out. The sheet, after passing through the drawing mechanism, goes into and through a leer as is usual in similar drawing operations. An arch 39, over rolls 18 and 19, forms a partially enclosed chamber above these rolls, but it will be noted that the sides of this chamber are left open, both to provide access to the rolls and coolers, and also to allow the cooler outer atmosphere to encounter the forming sheet and increase the possible speed of the drawing operations.

In commencing the operation of this apparatus, the roll 19 is first adjusted up clear of molten bath 2, and then by means of a bait, a sheet of glass is drawn over roll 18, under roll 19, over roll 25 and thence through the drawing mechanism 35. Provision is made for positively driving each of the rolls 18, 19 and 25, a sprocket chain drive for roll 25 being indicated at 40 in Fig. 2. After the operation of the apparatus is successfully initiated, any one or all of these rolls may be run as idlers, according as prevailing conditions may prove most desirable. After sheet 27 is started, the sheet of wire mesh 11 is led under roll 19, over roll 25 and engaged by the drawing mechanism 35. The roll 19 is then adjusted down until it dips the desired extent into bath 2, so that the wire combines with the sheet, and the desired recoating is obtained on the lower side. As the glass level in the bath may vary somewhat from time to time, the roll 19 may be adjusted accordingly.

It will be noted that with this system, no attempt is made to draw two separate sheets of glass and unite them about a sheet of wire mesh. The final sheet 32 is really drawn from beneath roll 19, although the upper half of this sheet has been previously formed and partially set to insure the substantial centering of the wire mesh within the sheet. Also the sheet is not bent through any sharp angles. Sheet 27 is not formed until it leaves the roll 18, and the bending angles about rolls 19 and 25 are each substantially less than 90°. By connecting on a new roll of wire 12, when the first becomes exhausted, the operation may be made practically continuous.

Claims:

1. The method of drawing wire glass, wherein a continuous sheet of glass is drawn from a mass of molten glass and then dipped along with a sheet of wire mesh, into a molten bath of glass.

2. The method of drawing wire glass, wherein a continuous sheet of glass is drawn from a mass of molten glass, one face of the sheet being maintained cool, whereas the other face is heated and dipped along with a contacting sheet of wire mesh, into a molten bath of glass, wherein the sheet and wire are united, and a new sheet surface formed covering the wire mesh.

3. The method of forming wire glass, wherein a continuous sheet of glass, and a continuous sheet of wire mesh are drawn through a molten bath of glass, only the face of the sheet adjacent the wire being exposed to the molten glass.

4. In an apparatus for drawing wire glass, a receptacle containing a bath of molten glass, means for drawing a sheet of glass therefrom, means for feeding a sheet of wire mesh in under the glass sheet, and means for causing the wire and superposed glass sheet to dip back into the molten bath, whereby the wire mesh becomes embedded within the finished sheet.

5. In an apparatus for drawing wire glass, a receptacle containing a bath of molten glass, a horizontal cooled roll mounted above the bath so that its lower surface dips slightly into the molten bath, and means for passing a continuous sheet of glass with a sheet of wire mesh therebeneath, under this roll.

6. In an apparatus for drawing wire glass, a receptacle containing a bath of molten glass, a horizontal cooled roll mounted above the bath so that its lower surface dips slightly into the molten bath, means for drawing a sheet of glass upwardly from the bath and then under this roll, and means for feeding a sheet of wire mesh in under the sheet before it dips into the molten bath.

7. In an apparatus for drawing wire glass, a receptacle containing a bath of molten glass, a horizontal cooled roll mounted in proximity to the molten bath, a second parallel cooled roll with its lower surface dipping slightly into the molten bath, means for drawing a sheet of glass over the first roll and under the second roll, and means for feeding in a sheet of wire mesh below the sheet between the two rolls.

8. In an apparatus for drawing wire glass, a receptacle containing a bath of molten glass, a series of parallel horizontal cooled rolls mounted above the receptacle, a sheet of glass being drawn laterally from the bath over the first roll, means for feeding in a sheet of wire mesh below this sheet, the sheet and wire being drawn laterally below the second roll and dipping into the molten bath, the sheet then being drawn up over a third roll, a drawing mechanism for stretching the sheet horizontally from the third roll, means for cooling the upper side of the sheet between the first and second rolls, and means for cooling the lower side of the sheet between the second and third rolls.

Signed at Toledo, in the county of Lucas and State of Ohio, this 15th day of February, 1921.

CLIFFORD A. ROWLEY.

Certificate of Correction.

It is hereby certified that in Letters Patent No. 1,425,218, granted August 8, 1922, upon the application of Clifford A. Rowley, of Toledo, Ohio, for an improvement in "Methods and Apparatus for Drawing Wire Glass," an error appears in the printed specification requiring correction as follows: Page 1, line 19, for the word "molten" read *mottled;* and that the said Letters Patent should be read with this correction therein that the same may conform to the record of the case in the Patent Office.

Signed and sealed this 19th day of September, A. D., 1922.

[SEAL.]                                          WM. A. KINNAN,

*Acting Commissioner of Patents.*